(12) United States Patent
Fukuda et al.

(10) Patent No.: US 8,367,140 B2
(45) Date of Patent: Feb. 5, 2013

(54) CONCENTRATE COMPOSITION FOR DRINK FROM CONCENTRATE

(75) Inventors: Masahiro Fukuda, Sumida-ku (JP); Eri Itaya, Sumida-ku (JP); Hirokazu Takahashi, Sumida-ku (JP); Ryo Kusaka, Sumida-ku (JP)

(73) Assignee: Kao Corporation, Tokyo (JP)

( * ) Notice: Subject to any disclaimer, the term of this patent is extended or adjusted under 35 U.S.C. 154(b) by 724 days.

(21) Appl. No.: 12/594,222

(22) PCT Filed: May 7, 2008

(86) PCT No.: PCT/JP2008/001146
§ 371 (c)(1),
(2), (4) Date: Oct. 1, 2009

(87) PCT Pub. No.: WO2008/139725
PCT Pub. Date: Nov. 20, 2008

(65) Prior Publication Data
US 2010/0143554 A1    Jun. 10, 2010

(30) Foreign Application Priority Data

| May 8, 2007 | (JP) | 2007-123968 |
| May 8, 2007 | (JP) | 2007-123969 |
| Apr. 8, 2008 | (JP) | 2008-100386 |
| Apr. 8, 2008 | (JP) | 2008-100387 |

(51) Int. Cl.
A23F 3/00    (2006.01)

(52) U.S. Cl. .......................................... 426/597

(58) Field of Classification Search ............... 426/597, 426/590, 330.3, 106
See application file for complete search history.

(56) References Cited

U.S. PATENT DOCUMENTS

| 5,318,986 | A | 6/1994 | Hara et al. | |
| 6,413,570 | B1 | 7/2002 | Lehmberg et al. | |
| 7,056,547 | B2 * | 6/2006 | Ogura et al. | 426/597 |
| 2003/0082273 | A1 | 5/2003 | Iwasaki et al. | |
| 2004/0028793 | A1 | 2/2004 | Inaoka et al. | |
| 2005/0003068 | A1 | 1/2005 | Kester et al. | |
| 2005/0084574 | A1 * | 4/2005 | Yamada | 426/427 |
| 2005/0095343 | A1 * | 5/2005 | Ogura et al. | 426/597 |
| 2005/0129829 | A1 * | 6/2005 | Hosoya et al. | 426/597 |
| 2005/0163889 | A1 * | 7/2005 | Yamada et al. | 426/106 |
| 2007/0128327 | A1 | 6/2007 | Takashima et al. | |
| 2008/0268129 | A1 | 10/2008 | Kester et al. | |
| 2010/0015288 | A1 | 1/2010 | Fukuda et al. | |
| 2010/0143554 | A1 | 6/2010 | Fukuda et al. | |

FOREIGN PATENT DOCUMENTS

| EP | 1297757 | * | 9/2002 |
| EP | 2 095 727 A1 | | 9/2009 |
| EP | 2 143 344 A1 | | 1/2010 |
| JP | 60-156614 | | 8/1985 |
| JP | 2-13348 | | 1/1990 |
| JP | 3-133928 | | 6/1991 |
| JP | 8-109178 | | 4/1996 |
| JP | 8-298930 | | 11/1996 |
| JP | 2002-84973 | | 3/2002 |
| JP | 2002-142677 | | 5/2002 |
| JP | 2003 169641 | | 6/2003 |
| JP | 2004 041186 | | 2/2004 |
| JP | 2004 187613 | | 7/2004 |
| JP | 2006/217837 | | 8/2006 |
| WO | 2005 053415 | | 6/2005 |

OTHER PUBLICATIONS

Extended Search Report issued Mar. 25, 2011 in Europe Application No. 08751671.2.

* cited by examiner

*Primary Examiner* — Anthony Weier
(74) *Attorney, Agent, or Firm* — Oblon, Spivak, McClelland, Maier & Neustadt, L.L.P.

(57) ABSTRACT

A concentrated beverage composition for reconstitution is reduced in bitterness and astringency, adequate in both sweetness and sourness and improved in storage stability despite the inclusion of a high concentration of non-polymer catechins. The concentrated beverage composition for reconstitution contains (A) from 0.5 to 25.0 wt % of non-polymer catechins, (B) a carbohydrate, and (C) a hydroxycarboxylic acid, and meets the following conditions (D) and (E) as well as at least one condition selected from the following conditions (F1), (F2) and (F3):

(D) a content of gallic acid is lower than 0.6 wt %,
(E) a percentage of non-epi-forms in the non-polymer catechins is from 5 to 25 wt %,
(F1) a Brix degree is from 20 to 70, and when diluted with deionized water to give a non-polymer catechin concentration of 0.13 wt %, a pH is from 2.5 to 6.0,
(F2) a solid content is not lower than 70.0 wt %, and when diluted with deionized water to give a non-polymer catechin concentration of 0.13 wt %, a pH is from 2.5 to 6.0, and
(F3) an absorbance at 400 nm is smaller than 0.5 and a pH is from 2.5 to 6.0, when diluted with deionized water to give a non-polymer catechin concentration of 0.13 wt %.

17 Claims, No Drawings

CONCENTRATE COMPOSITION FOR DRINK FROM CONCENTRATE

FIELD OF THE INVENTION

This invention relates to a concentrated beverage composition for reconstitution, which contains a high concentration of non-polymer catechins.

BACKGROUND OF THE INVENTION

Catechins are reported to have physiological effects, such as a suppressing effect on the increase of cholesterol and an inhibitory effect on α-amylase activity (Patent Documents 1 and 2). For such effects to manifest, it is necessary for an adult to drink 4 to 5 cups of tea a day. Therefore, a technology enabling a beverage to contain a high concentration of catechins has been sought, so that catechins can be ingested conveniently in large amounts. Among such technologies is a method in which dissolved catechins are added to a beverage by making use of a concentrate of green tea extract (Patent Documents 3 to 5).

However, any commercially available concentrate of green tea extract could cause strong astringency and bitterness stemming from the components contained in the concentrate of green tea extract and is not good in the smooth flowing in the throat. From the standpoint of applicability for long-term drinking that is needed to actualize the physiological effects of catechins, a beverage that is reduced in the catechin astringency characteristic of a high catechin-containing beverage, has adequate sweetness and adequate sourness, and exhibits storage stability over a long period of time, has been sought. So far, a concentrated beverage composition for reconstitution has been developed that is easy to distribute before being packed in a beverage. This beverage, however, is not enough to reduce the bitterness of catechins (Patent Document 6).

In such a concentrated beverage composition for reconstitution, a preservative, specifically a hydroxycarboxylic acid, is generally used. Examples of the known methods that use a hydroxycarboxylic acid at the time of production of a beverage include a method in which ascorbic acid, a hydroxycarboxylic acid, is added to a tea extract or water in order to keep natural catechins in a good condition (Patent Documents 7 and 8), and a method in which catechins are extracted from green tea leaves using a ascorbic acid solution in order to obtain a green tea beverage which is smaller in the amount of leached tannin (Patent Document 9). However, there has so far been no report as to what influence could occur on a concentrate and its beverage obtained by the order of addition of a preservative such as ascorbic acid upon mixing the preservative in a beverage that contains non-polymer catechins.

[Patent Document 1] JP-A-60-156614
[Patent Document 2] JP-A-03-133928
[Patent Document 3] JP-A-2002-142677
[Patent Document 4] JP-A-08-109178
[Patent Document 5] JP-A-08-298930
[Patent Document 6] U.S. Pat. No. 6,413,570
[Patent Document 7] JP-A-2002-84973
[Patent Document 8] JP-A-2004-187613
[Patent Document 9] JP-A-02-13348

DISCLOSURE OF THE INVENTION

The present invention provides a concentrated beverage composition for reconstitution, which contains the following ingredients (A), (B) and (C):

(A) from 0.5 to 25.0 wt % of non-polymer catechins,
(B) a carbohydrate, and
(C) a hydroxycarboxylic acid,
wherein the composition meets the following conditions (D) and (E) alike and also satisfies at least one selected from the following conditions (F1), (F2) and (F3):
 (D) a content of gallic acid is lower than 0.6 wt %,
 (E) a percentage of non-epi-forms in the non-polymer catechins is from 5 to 25 wt %,
 (F1) a Brix degree is from 20 to 70, and when diluted with deionized water to give a non-polymer catechin concentration of 0.13 wt %, a pH is from 2.5 to 6.0,
 (F2) a solid content is not lower than 70.0 wt %, and when diluted with deionized water to give a non-polymer catechin concentration of 0.13 wt %, a pH is from 2.5 to 6.0, and
 (F3) an absorbance at 400 nm is smaller than 0.5 and a pH is from 2.5 to 6.0, when diluted with deionized water to give a non-polymer catechin concentration of 0.13 wt %.

The present invention also provides a process for producing the concentrated beverage composition for reconstitution, which includes the following steps (1) and (2) to be taken in this order:

(1) mixing the hydroxycarboxylic acid in water,
(2) mixing a concentrate and/or purified product of tea extract, which contains non-polymer catechins, in the water, and
(3) mixing the carbohydrate in the water.

PREFERRED EMBODIMENTS OF THE INVENTION

The present invention provides a concentrated beverage composition for reconstitution, which is reduced in bitterness and astringency, adequate in both sweetness and sourness and improved in storage stability despite the inclusion of a high concentration of non-polymer catechins, and also its production process.

The present inventors have found that among concentrated beverage compositions for reconstitution obtainable by mixing a carbohydrate as a sweetener and a hydroxycarboxylic acid as a sour seasoning in a concentrate containing a high concentration of non-polymer catechins and/or a purified product thereof, only those equipped with particular properties can meet the needs for reduced bitterness and both of adequate sweetness and adequate sourness when reconstituted into a beverage. This composition has also been found to be obtainable by mixing a concentrate and/or purified product of tea extract containing a high concentration of catechins, a carbohydrate as a sweetener and a hydroxycarboxylic acid as a sour seasoning in a specific order.

The concentrated beverage composition for reconstitution according to the present invention is good in storage stability, and when reconstituted, the resulting reconstituted beverage is reduced in bitterness and astringency and is adequate in both sweetness and sourness. Therefore, by using the concentrated beverage composition for reconstitution according to the present invention, it becomes possible to provide a reconstituted beverage which is reduced in bitterness and also has adequate sweetness and adequate sourness alike.

Further, the concentrated beverage composition for reconstitution according to the present invention has specific properties, so that it provides a good color tone when reconstituted into a beverage, and moreover, does not undergo much decrease in the content of non-polymer catechins even when stored over long term.

The term "non-polymer catechins (A)" as used herein is a generic term, which collectively encompasses non-epicatechins such as catechin, gallocatechin, catechin gallate and gallocatechin gallate, and epicatechins such as epicatechin, epigallocatechin, epicatechin gallate and epigallocatechin gallate. The concentration of non-polymer catechins is defined based on the total amount of the above-described eight non-polymer catechins.

The concentrated beverage composition for reconstitution according to the present invention contains non-polymer catechins (A) at from 0.5 to 25.0 wt %, preferably from 2.0 to 25.0 wt %, more preferably from 3.0 to 25.0 wt %, even more preferably from 4.0 to 18.0 wt % based on the total weight of the composition. When the content of the non-polymer catechins is 0.5 wt % or higher, the composition can be used in a smaller amount upon preparation of a reconstituted beverage, thereby making it easier to reduce the bitterness and astringency. When the content of the non-polymer catechins is 25.0 wt % or lower, on the other hand, it is possible to reduce the decrease of the non-polymer catechins during storage.

The non-polymer catechins in the concentrated beverage composition for reconstitution according to the present invention include epi-forms consisting of epigallocatechin gallate, epigallocatechin, epicatechin gallate and epicatechin; and non-epi-forms consisting of catechin gallate, gallocatechin gallate, gallocatechin and catechin. Non-epi-forms are rarely found in nature, and are formed by the thermal denaturation of epi-forms. Further, the non-polymer catechins change into polymer catechins by thermal denaturation. The percentage ([(E)/(A)]×100) of the non-epi-forms (E) in the non-polymer catechins, which is for use in the concentrated beverage composition for reconstitution according to the present, to the non-polymer catechins (A) is from 5 to 25 wt %, preferably from 8 to 20 wt %, more preferably from 12 to 17 wt %, not only because the reconstituted beverage is provided an improved taste, but also because the non-polymer catechins in the composition is provided improved storage stability.

The non-polymer catechins in the concentrated beverage composition for reconstitution according to the present invention include gallate body consisting of epigallocatechin gallate, gallocatechin gallate, epicatechin gallate and catechin gallate; and non-gallate body consisting of epigallocatechin, gallocatechin, epicatechin and catechin. Because the gallate body as ester-type non-polymer catechins is strong in bitterness, the percentage ([(H)/(A)]×100) of the gallate body (H) in the non-polymer catechins (A) in the concentrated beverage composition for reconstitution according to the present invention may preferably from 5 to 55 wt %. The lower limit of the percentage of gallate body as defined above may be more preferably 8 wt %, even more preferably 10 wt %, while its upper limit may be more preferably 54 wt %, even more preferably 53 wt %, even far more preferably 50 wt %, yet even far more preferably 48 wt % from the viewpoint of the reduction of bitterness. In addition, when the concentrated beverage composition for reconstitution is reconstituted into a beverage, the concentration of non-polymer catechin gallates may preferably be in a range of from 30 to 100 mg/100 mL as the reconstituted beverage is good in aftertaste disappearance.

The content weight ratio ((G)/(A)) of the caffeine (G) to the non-polymer catechins (A) in the concentrated beverage composition for reconstitution according to the present invention may be preferably from 0.0001 to 0.16, more preferably from 0.001 to 0.15, even more preferably from 0.01 to 0.14, even more preferably from 0.05 to 0.13. Upon reconstituting the concentrate composition into a reconstituted beverage, the taste balance is maintained when the ratio of the caffeine to the non-polymer catechins is 0.0001 or greater. On the other hand, a caffeine/non-polymer catechins ratio of 0.16 or smaller is preferred from the viewpoint f physiological effects. The caffeine (G) can be either a caffeine naturally found in a green tea extract, flavor, fruit extract and any other ingredient(s) employed as ingredients, or any other caffeine added newly.

The concentrated beverage composition for reconstitution according to the present invention, which contains a high concentration of non-polymer catechins, can be obtained, for example, by mixing a concentrate and/or purified product of tea extract, preferably a concentrate and/or purified product of green tea extract, to adjust the concentration of non-polymer catechins.

The concentrated beverage composition for reconstitution according to the present invention can be either liquid or solid. Whichever its form is, it contains the carbohydrate (B). The carbohydrate may be contained preferably at from 1.0 to 65.0 wt % based on the total weight of the concentrate composition. The lower limit of its content may be more preferably 10.0 wt %, even more preferably 15.0 wt %, even more preferably 20.0 wt %, yet far more preferably 24.0 wt %, while the upper limit may be more preferably 60.0 wt %, even more preferably 50.0 wt %, even more preferably 40.0 wt %. When the concentration of the carbohydrate falls within the above-described range, the reduction of bitterness and astringency in the resulting reconstituted beverage can be facilitated.

When the carbohydrate is contained at a predetermined concentration or higher in the concentrated beverage composition for reconstitution according to the present invention, sweetness can be readily balanced with sourness and saltiness. When the composition is diluted with deionized water such that the concentration of non-polymer catechins is lowered to 0.13 wt %, the degree of the sweetness of the thus-reconstituted beverage may preferably be at least 2 when sucrose is assumed to have a sweetness degree of 1 (References: JIS Z8144, Sensory Assessment Analysis-Terms, No. 3011, Sweetness; JIS Z9080, Sensory Assessment Analysis-Methods, Testing Method; Beverage Term Dictionary, 4-2 Classification of Sweetness Degrees, Material 11 (Beverage Japan, Inc.); Property Grading Test mAG Test, ISO 6564-1985(E), "Sensory Analysis—Methodology-Flavour profile method", etc.). When the degree of sweetness is 8 or smaller, on the other hand, it is possible to reduce a feeling of being caught in the throat that would be caused by the sweetness, and hence to leave an excellent feeling as the beverage passes down through the throat.

The carbohydrate in the concentrated beverage composition for reconstitution according to the present invention can be a monosaccharide, complex polysaccharide, oligosaccharide, sugar alcohol, or a mixture thereof. Examples of the monosaccharide include tetroses, pentoses, hexoses and ketohexoses. The hexoses can be, for example, aldohexoses such as glucose known as grape sugar. Fructose known as a fruit sugar is a ketohexose. As monosaccharides, mixed monosaccharides such as corn syrup, high-fructose corn syrup, fructoglucose syrup, glucofructose syrup, agape extract and honey can also be used. A preferred example of the complex polysaccharide is maltodextrin. In addition, polyhydric alcohols, for example, glycerols can also be used in the present invention.

As the carbohydrate in the concentrated beverage composition for reconstitution according to the present invention, a nonreducing sugar or sugar alcohol is more preferred to provide the non-polymer catechins with improved storage stability and to obtain optimal sweetness. Such nonreducing sugar and sugar alcohol can also be used in combination. As nonreducing sugars, oligosaccharides can be mentioned, including disaccharides such as sucrose, maltose, lactose, cellobiose and trehalose, trisaccharides such as raffinose, panose, melezitose and gentianose, and tetrasaccharides such as stachyose. Among these oligosaccharides, the important type are disaccharides, typical examples of which are saccharose available from sugarcane or sugar beet and sucrose known as beet sugar. Usable commercial products include granulated sugar, kurumato (fine crystallized sugar), processed sugar, liquid sugar, sugarcanes, maple syrup and the like, all of which are refined sugars.

The carbohydrate in the concentrated beverage composition for reconstitution according to the present invention may more preferably be a sugar alcohol from the viewpoint of calories. As sugar alcohols, erythritol, xylitol, maltitol, lactitol, palatinose, mannitol, tagatose and the like are preferred. Among these carbohydrates, erythritol is most suitable for the concentrated beverage composition for reconstitution according to the present invention because of its low calorific value.

The concentrated beverage composition for reconstitution according to the present invention contains the hydrocarboxylic acid (C), and may preferably contain the hydrocarboxylic acid (C) at from 0.01 to 10.0 wt % based on the total weight of the concentrate composition. The lower limit of its content may be more preferably 0.1 wt %, even more preferably 0.3 wt %, while the upper limit may be more preferably 9.0 wt %, even more preferably 5.0 wt %. As the hydroxycarboxylic acid, ascorbic acid, erythorbic acid, citric acid, gluconic acid, tartaric acid, lactic acid, malic acid or the like can be mentioned, although ascorbic acid is preferred for its pH adjustment and antioxidant effects. When the concentration of such a hydroxycarboxylic acid is 0.01 wt % or higher, the resulting reconstituted beverage can be provided with reduced bitterness and adequate sourness, and moreover, the non-polymer catechins can be provided with better storage stability. When the concentration of such a hydroxycarboxylic acid is 10.0 wt % or lower, on the other hand, the composition is provided with good viscosity and color tone, and moreover, adequate sourness and bitterness can be obtained when prepared into a reconstituted beverage.

The concentrated beverage composition for reconstitution according to the present invention contains gallic acid (D) at a concentration lower than 0.6 wt % based on the total weight of the concentrate composition. Its upper limit may be more preferably 0.5 wt %, even more preferably 0.3 wt %. On the other hand, its lower limit may be more preferably 0.01 wt %, even more preferably 0.05 wt %. When the content of gallic acid is lower than 0.6 wt %, undesired astringency can be reduced upon production of a reconstituted beverage. Gallic acid is abundantly contained especially in fermented tea, but is not contained much in unfermented tea. Unfermented tea is, therefore, preferred as a raw material for the concentrate or purified product of tea extract.

The absorbance at 400 nm of the concentrated beverage composition for reconstitution according to the present invention is smaller than 0.5, preferably smaller than 0.4, more preferably smaller than 0.37 when diluted with deionized water to give a non-polymer catechin concentration of 0.13 wt % which is a concentration suited for drinking. Its lower limit is 0.01, preferably 0.001. Further, its absorbance at 450 nm is smaller than 0.15, preferably smaller than 0.12, more preferably smaller than 0.10. Its lower limit is 0.01, preferably 0.001. In the case of such an absorbance, the concentrate composition is provided with an adequate color tone, and hence, with a good external appearance. It is to be noted that the level of storage stability can be measured with higher sensitivity at 400 nm than at 450 nm.

As the percentage of the non-epi-form non-polymer catechins (E) in the non-polymer catechins (A) is in the range of from 5 to 25 wt %, the concentrated beverage composition for reconstitution according to the present invention tends to give a good color tone of smaller than 0.5 in terms of absorbance at 400 nm or smaller than 0.15 in terms of absorbance at 450 nm when reconstituted with deionized water to give a non-polymer catechin concentration of 0.13 wt % which is a concentration suited for drinking.

When the concentrated beverage composition for reconstitution according to the present invention is a liquid, its Brix degree is from 20 to 70. From the viewpoints of the antioxidation of non-polymer catechins and handling, however, the Brix degree may be preferably from 35 to 60, more preferably from 40 to 50. A Brix degree of 20 or greater is effective for providing the resulting reconstituted beverage with reduced bitterness and astringency, while a Brix degree of 70 or smaller can reduce crystallization of the carbohydrate and hydroxycarboxylic acid contained in the concentrate composition.

When the concentrated beverage composition for reconstitution according to the present invention is a solid, for example, in a powder form, its solid content is 70.0 wt % or higher, preferably 80 wt % or higher, more preferably 90 wt % or higher from the viewpoints of the prevention of moisture absorption and handling. The concentrated beverage composition for reconstitution according to the present invention may preferably have an average particle size of 10 μm or smaller to permit the dissolution of non-polymer catechins at high concentration upon dissolving and drinking the concentrate composition. For the production of the concentrated beverage composition for reconstitution according to the present invention in the form of a powder, vacuum concentration, freeze concentration, or the like can be used. A powderization method can be either a dry method or a wet method, and can be vacuum drying, freeze drying, spray drying, or the like. Freeze drying is preferred from the standpoint of quality, but spray drying is preferred in cost. As a drying temperature, a range of from −50 to 120° C. can be adopted. The drying temperature in freeze drying is from −50 to 50° C. or so, and the drying temperature in spray drying is from 50° C. to 120° C. or so.

The pH (25° C.) of the concentrated beverage composition for reconstitution according to the present invention is in a range of from 2.5 to 6.0 when diluted with deionized water to give a non-polymer catechin concentration of 0.13 wt % which is a concentration suited for drinking. From the viewpoints of taste, color tone and storage stability, the pH may be preferably from 2.8 to 5.0, more preferably from 3.0 to 4.7, even more preferably from 3.8 to 4.5. Namely, a pH of 2.5 or higher can provide adequate sourness, and is advantageous for the maintenance of non-polymer catechins in long-term storage. A pH of 6.0 or lower, on the other hand, makes it difficult to induce a reaction between a sugar, which has reducing property, and non-polymer catechins during long-term storage, and is advantageous for the maintenance of non-polymer catechins.

The concentrated beverage composition for reconstitution according to the present invention is in a liquid or powder form, and is a concentrate for beverage, said concentrate including as ingredients at least one ingredient selected from a tea extract, its concentrate and its purified product, a carbohydrate, hydroxycarboxylic acid and the like (see THE CODEX GENERAL STANDARDS FOR FOOD ADDITIVES, 14.1.4.3). It is a reconstituted beverage that is obtained as a product by sterilization after a reconstituting operation such as adding deionized water, carbonated water, another beverage or the like to the concentrate. At the time of reconstitution, dilution can be conducted on the basis of the sugar refractometer readings (Brix) described as standards for concentrated fruit extracts and reconstituted fruit extracts in the JAS Leveling Standards for Fruit Extract Beverages (Compiled by Japanese Agricultural Standards Association, Page 79). In the present invention, it is also preferred to dilute the concentrated beverage composition for reconstitution such that the concentration of non-polymer catechins in the resulting reconstituted beverage is controlled to from 0.05 to 0.5 wt %. The concentrate and/or purified product of green tea extract may be additionally mixed to control the concentration of non-polymer catechins to such a level.

When the concentrated beverage composition for reconstitution according to the present invention is a liquid, it can also be used, for example, as a pre-portioned dilution beverage. When the concentrated beverage composition for reconstitution according to the present invention is in a powder form, on the other hand, tiny stick-type packs are preferred in that single cups of a beverage can be conveniently prepared, although it may be packed in a container and may be dispensed by using a measuring method that employs a spoon. It is also preferred for the maintenance of the quality of an instant powder beverage to fill with nitrogen gas the interior of a hermetic container the material of which is one having low oxygen permeability.

In the concentrated beverage composition for reconstitution according to the present invention or its reconstituted beverage, a natural sweetener other than the above-described carbohydrate or an artificial sweetener can be additionally mixed. Such a natural sweetener or artificial sweetener may be contained preferably at from 0.0001 to 20 wt %, more preferably at from 0.001 to 15 wt %, even more preferably at from 0.001 to 10 wt % in the reconstituted beverage. Examples of the artificial sweetener include high-sweetness sweeteners such as aspartame, sucralose, saccharin, cyclamate, acesulfame-K, L-aspartyl-L-phenylalanine lower alkyl ester sweetener, L-aspartyl-D-alanine amide, L-aspartyl-D-serine amide, L-aspartyl-hydroxymethylalkanamide sweetener and L-aspartyl-1-hydroxyethylalkanamide, thaumatin, glycyrrhizin, synthetic alkoxyaromatic compounds, and the like. Stevioside and other natural-source sweeteners are also usable.

In the concentrated beverage composition for reconstitution according to the present invention or its reconstituted beverage, one or more acids and/or salts thereof selected from succinic acid, fumaric acid, phosphoric acid and salts thereof can be used as sour seasoning(s) in addition to the above-described hydroxycarboxylic acid. To obtain adequate sourness, it is preferred to use such an acid and its salt in combination. Sodium fumarate and the like can be exemplified.

Other sour seasonings include adipic acid and fruit extracts obtained from natural sources. These sour seasonings may be contained preferably at from 0.01 to 0.5 wt %, more preferably at from 0.02 to 0.3 wt % in the beverage reconstituted from the concentrated beverage composition for reconstitution according to the present invention. Further, inorganic acids and inorganic acid salts can also be used. These inorganic acids and inorganic acid salts include diammonium hydrogenphosphate, ammonium dihydrogenphosphate, dipotassium hydrogenphosphate, disodium hydrogenphosphate, sodium dihydrogenphosphate, trisodium metaphosphate, tripotassium phosphate, and the like. These inorganic acids and inorganic acid salts may be contained preferably at from 0.01 to 0.5 wt %, more preferably at from 0.02 to 0.3 wt % in the beverage reconstituted from the concentrated beverage composition for reconstitution according to the present invention.

It is possible to mix one or more of flavorings (flavors) and fruit extracts (fruit juices) to the concentrated beverage composition for reconstitution according to the present invention or its reconstituted beverage with a view to improving its taste. Specific examples are natural or synthetic flavorings and fruit extracts. They can be selected from fruit juices, fruit flavors, plant flavors, and mixtures thereof. For example, a combination of a fruit juice with a tea flavor, preferably a green tea or black tea flavor has an attractive taste. Usable fruit extracts include apple, pear, lemon, lime, mandarin, grapefruit, cranberry, orange, strawberry, grape, kiwi, pineapple, passion fruit, mango, guava, raspberry, and cherry. Preferred are citrus juices, juices of grapefruit, orange, lemon, lime, mandarin, mango, passion fruit and guava, and mixtures thereof. Such a fruit extract may be contained preferably at from 0.001 to 20 wt %, more preferably at from 0.002 to 10 wt % in the reconstituted beverage. Preferred natural flavors include jasmine, chamomile, rose, peppermint, *Crataegus cuneata*, chrysanthemum, water caltrop, sugarcane, bracket fungus of the genus *Fomes* (*Fomes japonicus*), bamboo shoot, and the like. Even more preferred flavorings are citrus flavors including orange flavor, lemon flavor, lime flavor and grapefruit flavor. In combination with such citrus flavors, various other fruit flavors such as apple flavor, grape flavor, raspberry flavor, cranberry flavor, cherry flavor and pineapple flavor are also usable. These flavors can be derived from natural sources such as fruit extracts and balms, or can be synthesized. The term "flavoring" as used herein can also include blends of various flavors, for example, a blend of lemon and lime flavors and blends of citrus flavors and selected spices (typically, cola and soft drink flavors). Such a flavoring can be mixed preferably at from 0.0001 to 5 wt %, more preferably at from 0.001 to 3 wt % to the reconstituted beverage.

In the concentrated beverage composition for reconstitution according to the present invention or its reconstituted beverage, sodium and potassium can also be incorporated. The total concentration of sodium and potassium may preferably be from 0.001 to 0.5 wt % based on the reconstituted beverage.

As a specific example of sodium, one or more of readily-available sodium salts such as sodium ascorbate, sodium chloride, sodium carbonate, sodium hydrogencarbonate, sodium citrate, sodium phosphate, sodium hydrogenphosphate, sodium tartrate, sodium benzoate and the like, and mixtures thereof may be mixed. The sodium includes that originated from an added fruit extract or that originated from one or more ingredients in tea. The higher the concentration of sodium, the higher the degree of discoloration of the beverage. From the viewpoints of physiological effects and stability, the content of sodium may be preferably from 0.001 to 0.5 wt %, more preferably from 0.002 to 0.4 wt %, even more preferably from 0.003 to 0.2 wt %.

As a specific example of potassium, one or more of potassium salts such as potassium chloride, potassium carbonate, potassium sulfate, potassium acetate, potassium hydrogencarbonate, potassium citrate, potassium phosphate, potassium hydrogenphosphate, potassium tartrate, potassium sorbate and the like, and mixtures thereof may be mixed. The potassium includes that originated from an added fruit extract or that originated from one or more ingredients in tea. The concentration of potassium affects more the color tone during long-term high-temperature storage than the concentration of sodium. From the viewpoint of stability, the content of potassium may be preferably from 0.001 to 0.2 wt %, more preferably from 0.002 to 0.15 wt %, even more preferably from 0.003 to 0.12 wt %.

Minerals other than sodium or potassium can also be incorporated in the concentrated beverage composition for reconstitution according to the present invention or its reconstituted beverage. Preferred minerals are calcium, chromium, copper, fluorine, iodine, iron, magnesium, manganese, phosphorus, selenium, silicon, molybdenum, and zinc. More preferred minerals are magnesium, phosphorus and iron. These minerals can each be added preferably in an amount of at least 10 wt % of its daily requirement (U.S. RDI Standards, described in US 2005/0003068: U.S. Reference Intake) per package.

In the concentrated beverage composition for reconstitution according to the present invention or its reconstituted beverage, one or more vitamins can be incorporated further. Preferably, vitamin A, vitamin B and vitamin E can be added. Other vitamins such as vitamin D may also be added. Vitamin B includes a vitamin B complex selected from inositol, thiamine hydrochloride, thiamine nitrate, riboflavin, riboflavin 5'-phosphate sodium, niacin, nicotinamide, calcium pantothenate, pyridoxy hydrochloride, cyanocobalamin, folic acid and biotin. These vitamins can each be added preferably in an amount of at least 10 wt % of its daily requirement (U.S. RDI Standards, described in US 2005/0003068: U.S. Reference Intake) per package.

In the concentrated beverage composition for reconstitution according to the present invention or its reconstituted beverage, additives such as antioxidants, various esters, organic acids, organic acid salts, inorganic salts, colors, emulsifiers, preservatives, seasoning agents, vegetable extracts, flower honey extracts and quality stabilizers may be mixed either singly or in combination, in addition to the ingredients originated from tea.

A description will next be made about the process according to the present invention for the production of the concentrated beverage composition for reconstitution.

In the process according to the present invention for the production of the concentrated beverage composition for reconstitution, (1) the hydroxycarboxylic acid is firstly mixed in water (step (1)). It is preferred to use water, the temperature of which is from 5 to 45° C., at this time from the viewpoints of providing the beverage (the resulting reconstituted beverage), which is to be reconstituted from the concentrated beverage composition for reconstitution, with reduced bitterness and also with both adequate sweetness and sourness. From the viewpoint of provided the reconstituted beverage with further reduced bitterness, the lower limit of the temperature of the water may be preferably 8° C., more preferably 10° C., even more preferably 35° C., while its upper limit may be preferably 42° C.

The lower limit of the amount of the hydroxycarboxylic acid to be used may be preferably 0.01 wt %, more preferably 0.1 wt %, even more preferably 0.3 wt % as its concentration in the concentrated beverage composition for reconstitution according to the present invention, while its upper limit may be preferably 10.0 wt %, more preferably 9 wt %, even more preferably 5.0 wt %.

The water can be deionized water, natural water, distilled water, tap water, or the like, with deionized water being preferred from the standpoint of taste.

It is preferred to then adjust an aqueous solution, which has been obtained in the step (1), such that its pH (25° C.) falls within a range of from 2.5 to 6.0 when diluted with deionized water to give a non-polymer catechin concentration of 0.13 wt % (pH adjusting step).

Namely, this pH adjusting step is an optional step for adjusting the pH of the aqueous solution obtained in the step (1). After conducting this step when the pH of the aqueous solution obtained in the step (1) is not in the range of from 2.5 to 6.0 or without conducting this step when the pH is in the above-described range, the step (2) to be described subsequently herein can be conducted.

For such a pH adjustment, it is preferred to charge an aqueous solution (weakly alkaline aqueous solution), which contains at least one salt selected from sodium hydrogencarbonate, sodium carbonate, potassium hydrogencarbonate and potassium carbonate, into the aqueous solution obtained in the step (1).

The amount of the weakly alkaline aqueous solution to be added is such an amount that the pH of the aqueous solution obtained in the step (1) falls within the range of from 2.5 to 6.0 when diluted with deionized water to give a non-polymer catechin concentration of 0.13 wt %. From the viewpoints of the flavor, color tone and storage stability of the reconstituted beverage, however, it is such an amount that the pH of the aqueous solution falls preferably within a range of from 2.8 to 5.5, more preferably within a range of from 3.0 to 5.0, even more preferably within a range of from 3.8 to 4.5. A pH of 2.5 or higher provides adequate sourness, and therefore, is advantageous for the maintenance of non-polymer catechins during long-term storage. A pH of 6.0 or lower, on the other hand, makes it difficult to induce the reaction between a sugar, which has reducing property, and non-polymer catechins in long-term storage, and therefore, is advantageous for the maintenance of non-polymer catechins. Using an organic acid such as ascorbic acid or citric acid instead of the above-described weakly alkaline aqueous solution, a pH adjustment can also be effected to reach the above-described range. As a result, it is possible to obtain a concentrated beverage composition for reconstitution, which permits long-term storage and has adequate sourness.

By conducting a pH adjusting step next to the step (1) as described above, it is possible to inhibit bubbling in the subsequent steps and also to provide the resulting reconstituted beverage with reduced bitterness. Stirring should be conducted for a sufficient time (preferably 5 minutes or longer) until bubbling subsides after the weakly alkaline aqueous solution is charged.

In the aqueous solution obtained in the step (1) or the pH adjusting step, a concentrate and/or purified product of tea extract, said concentrate and/or purified product containing non-polymer catechins, is then mixed (step (2)). By mixing the concentrate and/or purified product of tea extract under acidic conditions as described above, it is possible to improve the color tone and storage stability, to reduce the bitterness and astringency, and further, to impart adequate sourness.

The concentrate and/or purified product of tea extract is added such that the concentration of non-polymer catechins in the concentrated beverage composition for reconstitution becomes from 0.5 to 25 wt %, preferably from 2.0 to 25.0 wt %, more preferably from 3.0 to 25.0 wt %, even more preferably from 4.0 to 18.0 wt %. When the content of non-polymer catechins is in the above-described range, it is possible, when prepared into a reconstituted beverage, to surely expect the physiological effects of non-polymer catechins and to sufficiently reduce bitterness and astringency.

As the concentrate and/or purified product of tea extract to be used in the present invention, a concentrate and/or purified product of green tea extract is preferred. Specifically, an aqueous solution of a concentrate and/or purified product of green tea extract or one obtained by mixing a green tea extract with the concentrate and/or purified product of green tea extract can be mentioned, with the purified product of green tea extract being preferred. The term "a concentrate of green tea extract" as used herein means one obtained with an increased concentration of non-polymer catechins by removing a portion of water from a solution extracted from green tea leaves with hot water or a water-soluble organic solvent, and as its forms, various forms such as a solid, aqueous solution and slurry can be mentioned.

As concentrates of purified products of green tea extracts containing non-polymer catechins, commercially-available "POLYPHENON" (Mitsui Norin Co., Ltd.), "TEAFURAN (ITO EN, LTD.), "SUNPHENON" (Taiyo Kagaku Co., Ltd.) and the like can be mentioned. Those obtained by purifying such commercial products may also be used insofar as the concentrations of non-polymer catechins fall within a range to be described subsequently herein.

As a purification method, there is, for example, a method that suspends a green tea extract or a concentrate thereof in water or a mixture of water and an organic solvent such as ethanol (hereinafter called "an aqueous solution of organic solvent"), removes the resulting precipitate, and then distillates off the solvent.

Preferred as the purified product of green tea extract, said purified product being for use in the present invention, is one obtained by subjecting, in addition to or in place of the above-mentioned precipitate removal processing, a green tea extract or a concentrate thereof (hereinafter called "a green tea extract or the like") to treatment by one or more of the following methods.

(i) a method that adds at least one treatment material selected from activated carbon, acid clay or activated clay to the green tea extract or the like and conducts treatment.

(ii) a method that subjects the green tea extract or the like to tannase treatment.

(iii) a method that subjects the green tea extract or the like to treatment with a synthetic adsorbent.

In the purification of the green tea extract, it is preferred to add at least one treatment material selected from activated carbon, acid clay or activated clay and to conduct purification before suspending the green tea extract or the like in water or an aqueous solution of organic solvent and removing the resulting precipitate. It is more preferred to add activated carbon and acid clay or activated clay to conduct the treatment. No particular limitation is imposed on the order in which the green tea extract or the like is brought into contact with activated carbon and acid clay or activated clay. There can be mentioned, for example, (1) a method that disperses or dissolves the green tea extract or the like in water or an aqueous solution of organic solvent and bring the resulting dispersion or solution into contact with activated carbon and acid clay or activated clay, (2) a method that disperses activated carbon and acid clay or activated clay in water or an aqueous solution of organic solvent, and brings the green tea extract or the like into contact with the resulting dispersion, and (3) a method that brings a dispersion or solution of the green tea extract or the like in water or an aqueous solution of organic solvent into contact with acid clay or activated clay and then with activated carbon, or brings a dispersion or solution of the green tea extract or the like in water or an aqueous solution of organic solvent into contact with activated carbon and then with acid clay or activated clay.

Among these, the method (1) or (3) is preferred. It is to be noted that a filtration step may be interposed between the respective steps in each of the methods (1) to (3) and subsequent to separation by filtration, the procedure may then move to the subsequent step.

As the organic solvent for use in the purification of the green tea extract or the like, a water-soluble organic solvent is preferred. Examples include alcohols such as methanol and ethanol, ketones such as acetone, and esters such as ethyl acetate, with ethanol being preferred especially in view of use in beverages or foods. The water can be deionized water, distilled water, tap water, natural water or the like, with deionized water being preferred especially from the standpoint of taste.

As the proportions of the green tea extractor the like and the water or the aqueous solution of organic solvent, the green tea extract (dry weight basis) can be added in a proportion of preferably from 10 to 40 weight parts, more preferably from 10 to 30 weight parts to 100 weight parts of the water or the aqueous solution of organic solvent to conduct the treatment, because the green tea extract can be efficiently treated.

For the contact treatment, it is preferred to include an aging time of from 10 to 180 minutes or so. Such treatment can be conducted at from 10 to 60° C., preferably at from 10 to 50° C., more preferably at from 10 to 40° C.

The weight ratio of the organic solvent to the water in the aqueous solution of organic solvent may be set preferably at from 99/1 to 10/90. The upper limit of the weight ratio may be more preferably at 97/3, even more preferably at 95/5, even more preferably at 75/25, while the lower limit may be more preferably at 20/80, even more preferably at 65/30. The preferred combination of these weight ratios may be from 99/1 to 75/25 (more preferably, 70/30) from the viewpoints of increasing the concentration of non-polymer catechins and eliminating flavor ingredients originated from green tea or from 75/25 to 10/90 (more preferably, 5/95) from the viewpoint of allowing flavor ingredients, which are originated from green tea, to remain. The setting of such a weight ratio makes it possible to reduce bitterness and astringency, to have sweetness and sourness balanced well, and also to impart a refreshing sensation.

When the organic solvent is ethanol, no particular limitation is imposed on the method for dispersing the green tea extract or the like in the mixed solution of ethanol and water insofar as upon finally treating the green tea extract or the like, the weight ratio of ethanol to water is in the range of from 99/1 to 10/90. For example, ethanol may be added subsequent to dissolution of the green tea extract or the like in water to adjust the weight ratio of ethanol and water to the range of from 99/1 to 10/90, or subsequent to suspension of the green tea extract or the like in ethanol, water may be gradually added to adjust to the above-described weight ratio.

As the activated carbon for use in the contact treatment, a commercial product such as, for example, "ZN-50" (product of Hokuetsu Carbon Industry Co., Ltd.), "KURARAY COAL GLC", "KURARAY COAL PK-D" or "KURARAY COAL PW-D" (product of Kuraray Chemical K.K.), or "SHIROWASHI AW50", "SHIROWASHI A", "SHIROWASHI M" or "SHIROWASHI C" (product of Takeda Pharmaceutical Company Limited) can be used. The pore volume of the activated carbon may be preferably from 0.01 to 0.8 mL/g, more preferably from 0.1 to 0.8 mL/g. Concerning the specific surface area, on the other hand, one having a specific surface area in a range of preferably from 800 to 1,600 $m^2/g$, more preferably from 900 to 1,500 $m^2/g$ is preferred. It is to be noted that these physical values are those determined by the nitrogen adsorption method.

The activated carbon can be added preferably in a proportion of from 0.5 to 8 weight parts, more preferably from 0.5 to 3 weight parts to 100 weight parts of the water or the aqueous solution of organic solvent because of the purification efficiency of the green tea extract and smaller cake resistance in the filtration step.

The acid clay and activated clay for use in the contact treatment both contain, as general chemical components, $SiO_2$, $Al_2O_3$, $Fe_2O_3$, CaO, MgO, etc., and those having $SiO_2/Al_2O_3$ ratios of from 3 to 12, preferably from 4 to 9 are preferred. Also preferred are those which have compositions containing from 2 to 5 wt % of $Fe_2O_3$, from 0 to 1.5 wt % of CaO and from 1 to 7 wt % of MgO.

The specific surface areas of the acid clay and activated clay may preferably be from 50 to 350 $m^2/g$, and their pHs (5 wt % suspensions) may be preferably from 2.5 to 8, more preferably from 3.6 to 7. As the acid clay, for example, a commercial product such as "MIZUKA-ACE #600" (product of Mizusawa Industrial Chemicals, Ltd.) can be used.

The ratio of the activated carbon to the acid clay or activated clay may be from 1 to 10 of the acid clay or activated clay to 1 of the activated carbon by weight, with the activated carbon:the acid clay or activated clay=1:1 to 1:6 being preferred.

The acid clay or activated clay can be added in a proportion of preferably from 2.5 to 25 weight parts, more preferably from 2.5 to 15 weight parts to 100 weight parts of the water or aqueous solution of organic solvent. The addition of the acid clay or the like in a proportion or 2.5 weight parts or greater leads to good efficiency for the purification of the green tea extract, while the addition of the acid clay or the like in a proportion of 25 weight parts or smaller develops no production problem such as cake resistance in the filtration step.

Upon separation of the activated carbon or the like from the water or the aqueous solution of organic solvent, the temperature may be preferably from −15 to 78° C., more preferably from −5 to 40° C. Within this temperature range, the separation performance is good. As a separation method, a conventionally-known technology can be used. For example, the separation may be effected by passing the water or the aqueous solution of organic solvent through a column packed with a granular substance such as activated carbon, instead of a method such as so-called filter separation or centrifugal separation.

As the purified product of green tea extract in the present invention, one having a percentage of gallate body lowered by tannase treatment can be used. This treatment with tannase can also be conducted in the production stage of either the green tea extract containing non-polymer catechins or the purified product of green tea extract. Tannase may preferably be added such that its amount falls within a range of from 0.5 to 10 wt % relative to the non-polymer catechins in the green tea extract or the purified product of green tea extract. The temperature of the tannase treatment may be preferably from 15 to 40° C. at which its enzyme activity is available, with from 20 to 30° C. being more preferred. At the time of the tannase treatment, the pH (25° C.) may be preferably from 4 to 6 at which its enzyme activity is available, with from 4.5 to 6 being more preferred, and from 5 to 6 being even more preferred.

Subsequently, the temperature is raised as promptly as possible to from 45 to 95° C., preferably from 75 to 95° C. such that the tannase is inactivated to terminate the enzyme reaction. By the inactivation treatment of the tannase, a green tea extract or a purified product of green tea extract is obtained with an intended percentage of gallate body.

From the aspects of the bitterness reduction and external appearance, control is performed such that the percentage of gallate body in the resulting green tea extract or in the resulting purified product of green tea extract falls within a range of preferably from 5 to 55 wt %, more preferably from 10 to 50 wt %. In the control of the percentage of gallate body by the tannase treatment, it is preferred to determine the end point of the reaction by relying upon pH variations of the green tea extract or the purified product of green tea extract during the treatment. The pH (25° C.) may be preferably from 3 to 6, more preferably from 3.5 to 5.5. By this control, the green tea extract or the purified product of green tea extract can be obtained with a desired percentage of gallate body.

In the present invention, the green tea extract or the like can be purified further by treating it with a synthetic adsorbent. A synthetic adsorbent is generally an insoluble polymer of three-dimensionally-crosslinked structure, and is substantially free of functional groups such as ion-exchanging groups. As the synthetic adsorbent, it is preferred to use one having an ion exchange capacity of lower than 1 meq/g. Usable examples of such a synthetic adsorbent include commercial products such as styrene-based adsorbents such as "AMBERLITE XAD4, XAD16HP, XAD1180, XAD2000" (supplier: Rohm & Haas USA), "DIAION HP20, HP21" (products of Mitsubishi Chemical Corporation), "SEPABEADS SP850, SP825, SP700, SP70" (products of Mitsubishi Chemical Corporation), and "VPOC1062" (product of Bayer AG); modified styrene-based adsorbents with adsorptive capacity enhanced by nuclear substitution with bromine atoms, such as "SEPABEADS SP205, SP206, SP207" (products of Mitsubishi Chemical Corporation); methacrylic adsorbents such as "DIAION HP1MG, HP2MG" (products of Mitsubishi Chemical Corporation); phenol-based adsorbents such as "AMBERLITE XAD761" (product of Rohm & Haas, Inc.); acrylic adsorbents such as "AMBERLITE XAD7HP" (product of Rohm & Haas, Inc.); polyvinyl chloride-based adsorbents such as "TOYOPEARL HW-40C" (product of TOSOH CORPORATION); and dextran-based adsorbents such as "SEPHADEX LH-20" (product of Pharmacia AB).

The matrix of the synthetic adsorbent may preferably be of the styrene base, methacrylic base, acrylic base or polyvinylchloride base, with a styrene base being preferred from the standpoint of separability between non-polymer catechins and caffeine.

As a manner of adsorbing the green tea extract or the like on the synthetic adsorbent in the present invention, it is possible to adopt a batch process that adds the synthetic adsorbent to the green tea extract or the like, stirs the mixture, and subsequent to adsorption, recovers the synthetic adsorbent by a filter operation; or a column process that performs adsorption treatment through continuous treatment by using a column packed with the synthetic adsorbent, with a continuous treatment method by a column being preferred from the standpoint of productivity. The amount of the adsorbent to be used can be suitably determined depending on the kind of the tea extract or the like to be used, but can be approximately 200 wt % or smaller based on the weight (dry weight) of the green tea extract or the like.

The column with the synthetic adsorbent packed therein may preferably be washed beforehand with a 95 wt % aqueous solution of ethanol at SV (space velocity)=0.5 to 10 [$h^-$] under loading conditions of from 2 to 10 [v/v] as a loading ratio to the synthetic adsorbent to remove the raw monomer for the synthetic adsorbent and other impurities and the like. The adsorptive capacity for non-polymer catechins can be improved by a method that subsequently conducts washing with water at SV=0.5 to 10 [$h^-$] under loading conditions of from 1 to 60 [v/v] as a loading ratio to the synthetic adsorbent to remove ethanol and hence to replace medium the solvent in the column with a water-based.

As conditions for loading the green tea extract or the like on the column packed with the synthetic adsorbent, it is preferred to load the green tea extract under loading conditions of a loading rate of SV (space velocity)=0.5 to 10 [h⁻] and a loading ratio of from 0.5 to 20 [v/v] to the synthetic adsorbent. A loading rate lower than 10 [h⁻] and a loading ratio smaller than 20 [v/v] result in sufficient adsorption of the non-polymer catechins or the like on the synthetic adsorbent.

After the green tea extract or the like is loaded, non-polymer catechins are then eluted with an aqueous solution of organic solvent.

As the aqueous solution of organic solvent, a mixed system of a water-soluble organic solvent and water is used. As the water-soluble organic solvent, ethanol is preferred from the viewpoint of use in beverages or foods. The ratio of the water-soluble organic solvent to the water is from 99/1 to 10/90, preferably from 50/50 to 5/95, more preferably from 40/70 to 10/90, with from 20/80 to 15/85 being far more preferred from the standpoint of the recovery rate of non-polymer catechins.

In the aqueous solution obtained in the step (2), a carbohydrate is then mixed (step (3)). As a result, the concentrated beverage composition for reconstitution according to the present invention is obtained. By the addition of the carbohydrate after the above-described step, the effects of reducing the bitterness and astringency of non-polymer catechins can be enhanced.

The carbohydrate may be used preferably in such an amount that it is contained at from 1.0 to 65.0 wt % in the concentrated beverage composition for reconstitution. The lower limit of the amount to be used may be preferably 10.0 wt %, more preferably 15.0 wt %, even more preferably 20.0 wt %, even more preferably 24.0 wt %, while its upper limit may be preferably 60.0 wt %, more preferably 50.0 wt %, even more preferably 40.0 wt %. The reconstituted beverage can be provided with sufficiently-reduced bitterness and astringency when the concentration of the carbohydrate is in the above-described range.

In the production process according to the present invention, the respective ingredients are added in the corresponding steps to adjust such that their concentrations and physical properties in the concentrated beverage composition for reconstitution have the predetermined values. As an alternative, it is possible to add, after the completion of all the steps, a step to adjust such that the concentrations and physical properties of the respective ingredients in the concentrated beverage composition for reconstitution have the predetermined values.

The step (1) may preferably be conducted at from 35 to 45° C. as described above. No particular limitations are imposed on the temperatures of the steps (2) and (3) and the pH adjusting step, but these steps may be conducted at a temperature of preferably 45° C. or lower, more preferably from 20 to 45° C.

The concentrated beverage composition for reconstitution, which is obtainable by the present invention, is in a liquid or powder form, and is a concentrate for beverage (see THE CODEX GENERAL STANDARDS FOR FOOD ADDITIVES, 14.1.4.3). It is a reconstituted beverage that is obtained as a product by sterilization after a reconstituting operation such as adding deionized water, carbonated water, another beverage or the like to the concentrate. At the time of reconstitution, dilution can be conducted on the basis of the sugar refractometer readings (Brix) described as standards for concentrated fruit extracts and reconstituted fruit extracts in the JAS Leveling Standards for Fruit Extract Beverages (Compiled by Japanese Agricultural Standards Association, Page 79). In the present invention, it is also preferred to control the concentration of non-polymer catechins in the product (the resulting reconstituted beverage) to from 0.05 to 0.5 wt %. The concentrate and/or purified product of green tea extract may be additionally mixed to control the concentration of non-polymer catechins to such a level.

Similar to general concentrates for beverages, the concentrated beverage composition for reconstitution obtainable by the present invention can preferably be supplied in retort cartons which use, as a material, polypropylene (PP), polyethylene terephthalate (PET) or aluminum evaporated films usable in packaging materials. It can also be supplied in the form of metal cans, PET bottles, glass containers or the like.

The concentrated beverage composition for reconstitution, which is obtainable by the present invention, is diluted with deionized water, carbonated water or the like into a reconstituted beverage after its shipping or storage. The concentrated beverage composition for reconstitution can be stored not only under refrigeration but also around room temperature (10 to 50° C.) owing to its excellent storage stability. The concentrated beverage composition for reconstitution, which is obtainable by the present invention, can be produced by packaging it in a package of PP or the like at the time of its production and, when heat sterilization is feasible, conducting heat sterilization under sterilization conditions prescribed in relevant regulations (in Japan, the Food Sanitation Act). For those which cannot be subjected to retort sterilization like PET bottles or paper packages, a process is adopted such that the concentrated beverage composition for reconstitution is sterilized beforehand at a high temperature for a short time under similar sterilization conditions as those described above, for example, by a plate-type heat exchanger or the like, is cooled to a particular temperature, and is then filled in a package. Under aseptic conditions, additional ingredients may be mixed to and filled in a filled package. It is also possible to conduct an operation such that subsequent to heat sterilization under acidic conditions, the pH of the concentrated beverage composition for reconstitution is caused to rise back to neutral under aseptic conditions or that subsequent to heat sterilization under neutral conditions, the pH of the concentrated beverage composition for reconstitution is caused to drop back to the acidic side under aseptic conditions. As illustrative sterilization conditions, sterilization at from 60 to 145° C. by a plate-type heat exchanger or the like is preferred from the viewpoints of taste, flavor and storage stability.

EXAMPLES (Measurements of Non-polymer Catechins, Caffeine and Gallic Acid)

After a concentrate composition (3.0 g or 1.7 g) according to the present invention for reconstituted beverage was diluted with deionized water to 100 g, the dilute was subjected to filtration through a membrane filter (0.8 μm) and then to dilution with distilled water. By a high-performance liquid chromatograph (model: "SCL-10AVP") manufactured by Shimadzu Corporation, fitted with a liquid chromatograph column packed with octadecyl-introduced silica gel, "L-COLUMN, TM ODS" (4.6 mm in diameter×250 mm; product of Chemicals Evaluation and Research Institute, Japan), the thus-prepared sample was measured at a column temperature of 35° C. by the gradient elution method. A mobile phase, Solution A, was a solution containing acetic acid at 0.1 mol/L in distilled water, while another mobile phase, Solution B, was a solution containing acetic acid at 0.1 mol/L in acetonitrile. The measurement was conducted under the conditions of 20 µL sample injection volume and 280 nm UV detector wavelength. After the measurements, the concentrations of non-polymer catechins, caffeine and gallic acid were determined by conducting conversions based on the dilution rate.

Concentration Gradient Conditions (vol %)

| Time | Eluent A | Eluent B |
|---|---|---|
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |
| 49 min | 97% | 3% |
| 62 min | 97% | 3% |

(Measurement of Brix Degree of Liquid Concentrated Beverage Composition for Reconstitution)

The Brix degree of each liquid concentrated beverage composition for reconstitution was measured by a digital refractometer ("RX-5000α", manufactured by Atago Co., Ltd.).

(Measurement of Solid Content of Solid Concentrated Beverage Composition for Reconstitution)

The solid content of each solid concentrated beverage composition for reconstitution was measured by placing its powder in a Petri dish, drying it at 105° C. for 4 hours in a constant-temperature dryer ("WFO-320", manufactured by Tokyo Rikakikai Co., Ltd.), and determining a reduction in weight in accordance with the following equation:

Solid content (wt %)=(Weight after drying/weight before drying)×100

(Measurement of Absorbance)

Non-polymer catechins were diluted with deionized water to a concentration of 0.13 wt %. The thus-prepared sample was placed in a 10 mm square plastic cell, and by a "UVMINI 1240 REFRACTOMETER" manufactured by Shimadzu Corporation, its absorbance at 450 nm or 400 nm was measured three times. The absorbance was determined as an average of the three measurements.

(Storage Test (Acceleration Test))

Each prepared concentrate composition was stored at 37° C. for 4 weeks, and was then diluted with deionized water to a concentration of 0.13 wt %. The absorbance of the dilute at 450 nm or 400 nm was measured by the refractometer, and the concentration of non-polymer catechins was also measured.

(Evaluation of Taste)

With respect to each reconstituted beverage, a drinking test was performed by a panel of five trained assessors. As a relative evaluation to a reference beverage to be described subsequently herein, bitterness was assessed in 6 stages, astringency in 6 stages, sourness in 3 stages, and sweetness in 4 stages. Averaged results were employed.

(Evaluation of Stability)

Each concentrated beverage composition for reconstitution was stored at 5° C. for 3 days after sterilization. After the storage, conditions of the concentrated beverage composition for reconstitution were visually observed, and were graded in accordance with the following standards.

Evaluation Standards:
C: Nonuniform
B: Slightly nonuniform
A: Uniform

Production Example 1

Production of a "Purified Product 1 of Green Tea Extract Containing Non-polymer Catechins"

A commercially-available concentrate of green tea extract ("POLYPHENONE HG", Mitsui Norin Co., Ltd.; 100 g) was dispersed in 90.0 wt % ethanol (900 g), followed by aging for 30 minutes. The dispersion was filtered through No. 2 filter paper and then through filter paper of 0.2 µm pore size. Deionized water (200 mL) was added to the filtrate, followed by concentration under reduced pressure. An aliquot (75.0 g) of the concentrate was placed in a stainless steel vessel, the total amount was brought to 1,000 g with deionized water, and then, a 5 wt % aqueous solution of sodium bicarbonate (3.0 g) was added to adjust its pH to 5.5. Under stirring conditions of 22° C. and 150 r/min, a solution of "KIKKOMAN TANNASE KTFH" (Industrial Grade, 500 U/g minimum; 0.27 g, 2.4 wt % based on the non-polymer catechins) dissolved in deionized water (1.07 g) was then added. Upon elapsed time of 55 minutes at which the pH had dropped to 4.24, the enzyme reaction was terminated. The stainless steel vessel was next immersed in a hot bath of 95° C., and was held there at 90° C. for 10 minutes to completely inactivate the enzyme activity. After the stainless steel vessel was cooled to 25° C., concentration processing was conducted to obtain a "purified product 1 of green tea extract containing non-polymer catechins". The non-polymer catechins amounted to 15.0 wt %, the percentage of non-polymer gallate body was 44.4 wt %, and the water content was 75.0 wt %.

Production Example 2

Production of a "Purified Product 2 of Green Tea Extract Containing Non-Polymer Catechins"

A commercially-available concentrate of green tea extract ("POLYPHENONE HG", Mitsui Norin Co., Ltd.; 1,000 g) was dispersed in a 95 wt % aqueous solution of ethanol (9,000 g) under stirring conditions of 25° C. and 200 r/min. After activated carbon ("KURARAY COAL GLC", product of Kuraray Chemical K.K.; 200 g) and acid clay "MIZUKA-ACE #600", product of Mizusawa Industrial Chemicals, Ltd.; 500 g) were charged, the resulting mixture was continuously stirred for about 10 minutes. Stirring was then continued at 25° C. for about 30 minutes. After the activated carbon, acid clay and precipitate were filtered off by No. 2 filter paper, the filtrate was filtered again through a 0.2 µm membrane filter. Finally, deionized water (200 g) was added to the filtrate, ethanol was distilled off at 40° C. and 3.3 kPa to achieve reduced-pressure concentration. An aliquot (750 g) of the concentrate was placed in a stainless steel vessel, the total amount was brought to 10,000 g with deionized water, and then, a 5 wt % aqueous solution of sodium bicarbonate (30 g) was added to adjust its pH to 5.5. Under stirring conditions of 22° C. and 150 r/min, a solution of "KIKKOMAN TANNASE KTFH" (Industrial Grade, 500 U/g minimum; 2.7 g) dissolved in deionized water (10.7 g) was then added. Upon elapsed time of 30 minutes at which the pH had dropped to 4.24, the enzyme reaction was terminated. The stainless steel vessel was next immersed in a hot bath of 95° C., and was held there at 90° C. for 10 minutes to completely inactivate the enzyme activity. After the stainless steel vessel was cooled to 25° C., concentration processing was conducted to obtain a "purified product 2 of green tea extract containing non-polymer catechins". The non-polymer catechins amounted to 15.0 wt %, the percentage of non-polymer gallate body was 44.4 wt %, and the water content was 75.0 wt %.

Production Example 3

Production of a "Purified Product 3 of Green Tea Extract Containing Non-polymer Catechins"

A commercially-available concentrate of green tea extract ("POLYPHENONE HG", Mitsui Norin Co., Ltd.; 1,000 g) was dispersed in a 95 wt % aqueous solution of ethanol (4,909 g) under stirring conditions of 25° C. and 200 rpm. After activated carbon ("KURARAY COAL GLC", product of Kuraray Chemical K.K.; 200 g) and acid clay "MIZUKA-ACE #600", product of Mizusawa Industrial Chemicals, Ltd.; 1,000 g) were charged, the resulting mixture was continuously stirred for about 10 minutes. Subsequent to dropwise addition of a 40 wt % aqueous solution of ethanol over 10 minutes, stirring was continued still at 25° C. for about 30 minutes. Finally, the aqueous solution of ethanol dropped to 70 wt %. After the activated carbon and precipitate were then filtered off by No. 2 filter paper, the filtrate was filtered again through a 0.2 μm membrane filter. Finally, deionized water (2,000 g) was added to the filtrate, and subsequent to cooling to 25° C., concentration was conducted to obtain a "purified product 3 of green tea extract containing non-polymer catechins". The non-polymer catechins amounted to 22.0 wt %, the percentage of non-polymer gallate body was 52.9 wt %, and the water content was 45.2 wt %.

Example 1

In deionized water of 40° C. under stirring, ascorbic acid (3.0 g) was dissolved, and a 10 wt % aqueous solution of sodium bicarbonate (10 g) was then charged. After having been stirred for 10 minutes until bubbling of carbon dioxide gas subsided, the "purified product 1 of green tea extract containing non-polymer catechins" (353.3 g), a concentrate of China green tea extract (73.0 g) and erythritol (274.0 g) were dissolved in this order in the deionized water to give a total amount of 1,000 g. Subsequent to UHT sterilization at 138° C., the thus-obtained concentrated beverage composition for reconstitution was filled in a retort carton. The concentrated beverage composition for reconstitution had the following data—the percentage of non-epi-forms: 15.0 wt %, the percentage of non-polymer gallate body: 46.3 wt %, the caffeine/non-polymer catechins ratio: 0.104, and the content of gallic acid: 0.16 wt %. The formula and physical properties of the concentrated beverage composition for reconstitution are shown in Table 1.

Employed next was an aliquot (17 g) of the thus-obtained concentrated beverage composition for reconstitution, to which fructose (38.6 g), erythritol (2.9 g), citric acid (1.0 g), ascorbic acid (0.45 g) and a green tea flavor (0.5 g) were added. The pH of the resulting mixture was adjusted to 4.0 with an aqueous solution of sodium bicarbonate, and its total amount was brought to 1,000 g with deionized water. The thus-obtained reconstituted beverage was subjected to UHT sterilization and filled in a glass container to obtain a packaged reconstituted beverage. The formula and taste evaluation results of the packaged reconstituted beverage are shown in Table 2.

Example 2

Employed was an aliquot (17 g) of the concentrated beverage composition for reconstitution obtained in Example 1, to which fructose (38.6 g), erythritol (2.9 g), citric acid (1.0 g), ascorbic acid (0.45 g) and a lemon-lime flavor (1.0 g) were added. The pH of the resulting mixture was adjusted to 4.0 with an aqueous solution of sodium bicarbonate, and its total amount was brought to 1,000 g with deionized water. The thus-obtained reconstituted beverage was subjected to UHT sterilization and filled in a glass container to obtain a packaged reconstituted beverage. The formula and taste evaluation results of the packaged reconstituted beverage are shown in Table 2.

Example 3

In deionized water of 40° C. under stirring, ascorbic acid (3.0 g) was dissolved, and a 10 wt % aqueous solution of sodium bicarbonate (15.0 g) was then charged. After having been stirred for 10 minutes until bubbling of carbon dioxide gas subsided, the "purified product 1 of green tea extract containing non-polymer catechins" (500.0 g) and erythritol (273.6 g) were dissolved in this order to give a total amount of 1,000 g. Subsequent to UHT sterilization at 138° C., the thus-obtained concentrated beverage composition for reconstitution was filled in a retort carton. The concentrated beverage composition for reconstitution had the following data—the percentage of non-epi-forms: 16.9 wt %, the percentage of non-polymer gallate body: 44.4 wt %, the caffeine/non-polymer catechins ratio: 0.059, and the content of gallic acid: 0.24 wt %. The formula and physical properties of the concentrated beverage composition for reconstitution are shown in Table 1.

Employed next was an aliquot (17 g) of the thus-obtained concentrated beverage composition for reconstitution, to which fructose (38.6 g), erythritol (2.85 g), ascorbic acid (0.45 g), citric acid (1.0 g) and a lemon-lime flavor (1.0 g) were added. The pH of the resulting mixture was adjusted to 4.0 with an aqueous solution of sodium bicarbonate, and its total amount was brought to 1,000 g with deionized water. The thus-obtained reconstituted beverage was subjected to UHT sterilization and filled in a glass container to obtain a packaged reconstituted beverage. The formula and taste evaluation results of the packaged reconstituted beverage are shown in Table 2.

Example 4

Employed was an aliquot (17 g) of the concentrated beverage composition for reconstitution obtained in Example 3, to which a concentrate of China green tea extract (0.2 g), fructose (38.6 g), erythritol (2.9 g), citric acid (1.0 g), ascorbic acid (0.45 g) and a green tea flavor (0.5 g) were added. The pH of the resulting mixture was adjusted to 4.0 with an aqueous solution of sodium bicarbonate, and its total amount was brought to 1,000 g with deionized water. The thus-obtained reconstituted beverage was subjected to UHT sterilization and filled in a glass container to obtain a packaged reconstituted beverage. The formula and taste evaluation results of the packaged reconstituted beverage are shown in Table 2.

Example 5

In deionized water of 40° C. under stirring, ascorbic acid (3.0 g) was dissolved, and a 10 wt % aqueous solution of sodium bicarbonate (15.0 g) was then charged. After having been stirred for 10 minutes until bubbling of carbon dioxide gas subsided, the "purified product 1 of green tea extract containing non-polymer catechins" (500.0 g) and erythritol (273.6 g) were dissolved in this order to give a total amount of 1,000 g. Using a freeze dryer ("BFD-2", Nihon Freezer Co., Ltd.), the resultant mixture was then dried under the conditions of −20° C. and 5 to 10 Torr to obtain a powder of a concentrated beverage composition for reconstitution (374 g). The powdery concentrated beverage composition for reconstitution had the following data—the percentage of non-epi-forms: 12.2 wt %, the percentage of non-polymer gallate body: 44.4 wt %, the caffeine/non-polymer catechins ratio: 0.059, and the content of gallic acid: 0.24 wt %. The formula and physical properties of the concentrated beverage composition for reconstitution are shown in Table 1.

Employed next was an aliquot (7.8 g) of the thus-obtained powdery concentrated beverage composition for reconstitution, to which fructose (38.6 g) and a green tea flavor (0.5 g) were added. The pH of the resulting mixture was adjusted to 4.0 with an aqueous solution of sodium bicarbonate, and its total amount was brought to 1,000 g with deionized water. The thus-obtained reconstituted beverage was subjected to UHT sterilization and then filled in a glass container to obtain a packaged reconstituted beverage. The formula and taste evaluation results of the packaged reconstituted beverage are shown in Table 2.

Comparative Example 1

In deionized water of 40° C. under stirring, the "purified product 1 of green tea extract containing non-polymer catechins" (500.0 g), ascorbic acid (3.0 g), erythritol (273.6 g) and a 10 wt % aqueous solution of sodium bicarbonate (15.0 g) were dissolved in this order to give a total weight of 1,000 g. Subsequent to UHT sterilization at 146° C., the thus-obtained concentrated beverage composition for reconstitution was filled in a retort carton. The concentrated beverage composition for reconstitution had the following data—the percentage of non-epi-forms: 44.9 wt %, the percentage of non-polymer gallate body: 44.4 wt %, the caffeine/non-polymer catechins ratio: 0.059, and the content of gallic acid: 0.24 wt %. The formula and physical properties of the concentrated beverage composition for reconstitution are shown in Table 1.

Employed next was an aliquot (17 g) of the thus-obtained concentrated beverage composition for reconstitution, to which fructose (38.6 g), erythritol (2.85 g), citric acid (1.0 g) and a lemon-lime flavor (1.0 g) were added. The pH of the resulting mixture was adjusted to 5.45 with an aqueous solution of sodium bicarbonate, and its total amount was brought to 1,000 g with deionized water. The thus-obtained reconstituted beverage was subjected to UHT sterilization and filled in a glass container to obtain a packaged reconstituted beverage. The formula and taste evaluation results of the packaged reconstituted beverage are shown in Table 2.

Reference Beverage

In deionized water of 40° C. under stirring, the "purified product 1 of green tea extract containing non-polymer catechins" (177.0 g), a concentrate of China green tea extract (73.0 g), ascorbic acid (89.3 g), erythritol (250.0 g) and a 10 wt % aqueous solution of sodium bicarbonate (1.0 g) were dissolved in this order to give a total weight of 1,000 g. Subsequent to UHT sterilization at 146° C., the thus-obtained concentrated beverage composition for reconstitution was filled in a retort carton. The concentrated beverage composition for reconstitution had the following data—the percentage of non-epi-forms: 45.0 wt %, the percentage of non-polymer gallate body: 47.3 wt %, the caffeine/non-polymer catechins ratio: 0.104, and the content of gallic acid: 0.09 wt %. The formula and physical properties of the concentrated beverage composition for reconstitution are shown in Table 1.

Employed next was an aliquot (30 g) of the thus-obtained concentrated beverage composition for reconstitution, to which fructose (38.6 g) and a green tea flavor (0.5 g) were added. The pH of the resulting mixture was adjusted to 5.45 with an aqueous solution of sodium bicarbonate, and its total amount was brought to 1,000 g with deionized water. The thus-obtained reconstituted beverage was subjected to UHT sterilization and filled in a glass container to obtain a packaged reconstituted beverage. The formula of the packaged reconstituted beverage is shown in Table 2.

TABLE 1

| | | Examples | | | | | Reference | Comp. Ex. |
| --- | --- | --- | --- | --- | --- | --- | --- | --- |
| | | 1 | 2 | 3 | 4 | 5 | Beverage | 1 |
| Purified product of green tea extract (Production Example) | | 1 | 1 | 1 | 1 | 1 | 1 | 1 |
| Formulas of concentrates | (a) Concentrate of green tea extract (wt %) | 7.3 | 7.3 | — | — | — | 7.3 | — |
| | (a) Purified product of green tea extract (wt %) | 35.33 | 35.33 | 50.0 | 50.0 | 50.0 | 17.7 | 50 |
| | (b) Erythritol (wt %) | 27.4 | 27.4 | 27.36 | 27.36 | 27.36 | 25.0 | 27.36 |
| | (c) Ascorbic acid (wt %) | 0.3 | 0.3 | 0.3 | 0.3 | 0.3 | 8.93 | 0.3 |
| | (d) Sodium bicarbonate (wt %) | 0.1 | 0.1 | 0.15 | 0.15 | 0.15 | 0.1 | 0.15 |
| | (e) Deionized water (wt %) | Bal. | Bal. | Bal. | Bal. | Bal. | Bal. | Bal. |
| | Total amount | 100 | 100 | 100 | 100 | 100 | 100 | 100 |
| Mixing order | | (e)↓(c)↓(d)↓(a)↓(b) | (e)↓(c)↓(d)↓(a)↓(b) | (e)↓(c)↓(d)↓(a)↓(b) | (e)↓(c)↓(d)↓(a)↓(b) | (e)↓(c)↓(d)↓(a)↓(b) | (e)↓(a)↓(c)↓(b)↓(d) | (e)↓(a)↓(c)↓(b)↓(d) |
| Water temperature (° C.) upon mixing | | 40 | 40 | 40 | 40 | 40 | 40 | 40 |
| Sterilization temperature (° C.) | | 138 | 138 | 138 | 138 | Unsterilized | 146 | 146 |
| Storage stability | | A | A | A | A | A | B | B |
| Physical properties of concentrated compositions | (A) Non-polymer catechins (wt %) | 7.50 | 7.50 | 7.50 | 7.50 | 16.36 | 13.24 | 7.5 |
| | (D) Gallic acid (wt %) | 0.16 | 0.16 | 0.24 | 0.24 | 0.24 | 0.09 | 0.24 |
| | (E) Percentage of non-epi-forms (wt %) | 15.0 | 15.0 | 16.9 | 16.9 | 12.2 | 45.0 | 44.9 |

TABLE 1-continued

|  |  | Examples | | | | | Reference Beverage | Comp. Ex. 1 |
|---|---|---|---|---|---|---|---|---|
|  |  | 1 | 2 | 3 | 4 | 5 | | |
|  | (H) Percentage of gallate body (wt %) | 46.3 | 46.3 | 44.4 | 44.4 | 44.4 | 47.3 | 44.4 |
|  | (G) Caffine/(A) non-polymer catechins (—) | 0.104 | 0.104 | 0.059 | 0.059 | 0.059 | 0.104 | 0.059 |
|  | Brix degree (—) | 46.4 | 46.4 | 41.3 | 41.3 | — | 49.3 | 41.3 |
|  | Solid content (wt %) | — | — | — | — | 90.1 | — | — |
|  | Absorbance (—)[1] | 0.210 | 0.210 | 0.141 | 0.141 | 0.141 | 0.225 | 0.225 |
|  | Absorbance (—)[2] | 0.090 | 0.091 | 0.020 | 0.020 | 0.011 | 0.162 | 0.162 |
|  | pH (25° C.)[3] | 4.35 | 4.35 | 4.30 | 4.30 | 4.28 | 5.45 | 5.45 |
| After storage | Absorbance (—) (37° C., 4 weeks)[1] | 0.238 | 0.231 | 0.174 | 0.173 | 0.170 | 0.251 | 0.251 |
|  | Absorbance (—) (37° C., 4 weeks)[2] | 0.118 | 0.118 | 0.026 | 0.026 | 0.022 | 0.214 | 0.214 |
|  | (A) Non-polymer catechins (wt %) (37° C., 4 weeks) | 7.11 | 7.11 | 7.17 | 7.17 | 16.18 | 2.67 | 2.67 |

[1] Absorbance at 400 nm when diluted with deionized such that the content of non-polymer catechins was controlled to 0.13 wt %.
[2] Absorbance at 450 nm when diluted with deionized such that the content of non-polymer catechins was controlled to 0.13 wt %.
[3] pH when diluted with deionized such that the content of non-polymer catechins was controlled to 0.13 wt %.

TABLE 2

|  |  | Examples | | | | | Reference Beverage | Comp. Ex. 1 |
|---|---|---|---|---|---|---|---|---|
|  |  | 1 | 2 | 3 | 4 | 5 | | |
| Formulas of reconstituted beverages | Concentrated beverage composition for reconstitution (wt %) | 1.7 | 1.7 | 1.7 | 1.7 | 0.78 | 30 | 1.7 |
|  | Concentrate of green tea extract (wt %) | — | — | — | 0.02 | — | — | — |
|  | Fructose (wt %) | 3.86 | 3.86 | 3.86 | 3.86 | 3.86 | 3.86 | 3.86 |
|  | Erythritol (wt %) | 0.29 | 0.29 | 0.285 | 0.29 | — | — | 0.285 |
|  | Citric acid (wt %) | 0.1 | 0.1 | 0.1 | 0.1 | — | — | 0.1 |
|  | Ascorbic acid (wt %) | 0.045 | 0.045 | 0.045 | 0.045 | — | — | — |
|  | Green tea flavor (wt %) | 0.05 | — | — | 0.05 | 0.05 | 0.05 | — |
|  | Lemon-lime flavor (wt %) | — | 0.1 | 0.1 | — | — | — | 0.1 |
|  | Sodium bicarbonate (wt %) | 0.054 | 0.054 | 0.054 | 0.054 | 0.054 | 0.042 | 0.054 |
|  | Deionized water (wt %) | Bal. | Bal. | Bal. | Bal. | Bal. | Bal. | Bal. |
|  | Total amount | 100 | 100 | 100 | 100 | 100 | 100 | 100 |
| After sterilization | Non-polymer catechins (wt %) | 0.130 | 0.130 | 0.128 | 0.135 | 0.128 | 0.130 | 0.130 |
|  | pH (25° C.) | 4.03 | 4.07 | 4.01 | 4.01 | 4.01 | 5.45 | 5.45 |
|  | Bitterness[4] | 1 | 1 | 2 | 2 | 2 | — | 4 |
|  | Astringency[5] | 2 | 2 | 1 | 1 | 1 | — | 3 |
|  | Sourness[6] | 1 | 1 | 1 | 1 | 1 | — | 2 |
|  | Sweetness[7] | 2 | 2 | 2 | 2 | 2 | — | 2 |

[4] 6-stage evaluation of bitterness, 1: no bitterness, 2: substantially-reduced bitterness, 3: reduced bitterness, 4: slightly-reduced bitterness, 5: bitter, 6: significant bitterness.
[5] 6-stage evaluation of astringency, 1: no astringency, 2: substantially-reduced astringency, 3: reduced astringency, 4: slightly-reduced astringency, 5: astringent, 6: significant astringency.
[6] 3-stage evaluation of sourness, 1: extremely good sourness, 2: good sourness, 3: usual sourness.
[7] 4-stage evaluation of sweetness, 1: extremely good sweetness, 2: good sweetness, 3: usual sweetness, 4: insufficient sweetness.

Example 6

In deionized water of 40° C. under stirring, ascorbic acid (3.0 g) was dissolved, and a 10 wt % aqueous solution of sodium bicarbonate (15.0 g) was then charged. After having been stirred for 10 minutes until bubbling of carbon dioxide gas subsided, the "purified product 2 of green tea extract containing non-polymer catechins" (500.0 g) and erythritol (245.0 g) were dissolved in this order in the deionized water to give a total amount of 1,000 g. Subsequent to UHT sterilization at 138° C., the thus-obtained concentrated beverage composition for reconstitution was filled in a retort carton. The formula and physical properties of the concentrated beverage composition for reconstitution are shown in Table 3.

Employed next was an aliquot (17.0 g) of the thus-obtained concentrated beverage composition for reconstitution, to which a concentrate of green tea extract (0.2 g), fructose (38.6 g), erythritol (2.9 g), citric acid (1.0 g), ascorbic acid (0.45 g) and a green tea flavor (0.5 g) were added. The pH of the resulting mixture was adjusted to 4.0 with an aqueous solution of sodium bicarbonate, and its total amount was brought to 1,000 g with deionized water. The thus-obtained reconstituted beverage was subjected to UHT sterilization and filled in a glass container to produce a packaged reconstituted beverage. The formula and taste evaluation results of the packaged reconstituted beverage are shown in Table 4.

Example 7

A packaged reconstituted beverage was produced as in Example 6 except that the concentrate of green tea extract was not used and a lemon-lime flavor was used in place of the green tea flavor. The formula and taste evaluation results of the packaged reconstituted beverage are shown in Table 4.

Example 8

A packaged reconstituted beverage was produced as in Example 6 except that a cyclodextrin was used without using fructose, erythritol and citric acid, sodium ascorbate was used in place of ascorbic acid, and the pH was not adjusted with the aqueous solution of sodium bicarbonate. The formula and taste evaluation results of the packaged reconstituted beverage are shown in Table 4.

Example 9

A packaged reconstituted beverage was produced as in Example 7 except that a grapefruit flavor and grapefruit extract were used without using the lemon-lime flavor, glucose, sucralose, sodium citrate, common salt and a cyclodextrin were used, citric acid was used in a greater amount, and the pH was not adjusted with the aqueous solution of sodium bicarbonate. The formula and taste evaluation results of the packaged reconstituted beverage are shown in Table 4.

Example 10

As in Example 6 except that the "purified product 2 of green tea extract containing non-polymer catechins" was changed to the "purified product 3 of green tea extract containing non-polymer catechins" and the aqueous solution of sodium bicarbonate was not used, a concentrated beverage composition for reconstitution was produced, and a packaged reconstituted beverage was then produced. The formula and physical properties of the concentrated beverage composition for reconstitution are shown in Table 3, and the formula and taste evaluation results of the packaged reconstituted beverage are shown in Table 4.

Example 11

As in Example 7 except that the "purified product 2 of green tea extract containing non-polymer catechins" was changed to the "purified product 3 of green tea extract containing non-polymer catechins" and the aqueous solution of sodium bicarbonate was not used, a concentrated beverage composition for reconstitution was produced, and a packaged reconstituted beverage was then produced. The formula and physical properties of the concentrated beverage composition for reconstitution are shown in Table 3, and the formula and taste evaluation results of the packaged reconstituted beverage are shown in Table 4.

Comparative Example 2

In deionized water of 40° C. under stirring, the "purified product 2 of green tea extract containing non-polymer catechins" (500.0 g), ascorbic acid (3.0 g), erythritol (245.0 g) and a 10 wt % aqueous solution of sodium bicarbonate (50.0 g) were dissolved in this order, and the resulting solution was stirred until bubbling of carbon dioxide gas subsided. The total weight was then brought to 1,000 g, and subsequent to UHT sterilization at 146° C., the thus-obtained concentrated beverage composition for reconstitution was filled in a retort carton. The concentrated beverage composition for reconstitution had the following data—the percentage of non-epi-forms: 41.1 wt %, the percentage of non-polymer gallate body: 44.4 wt %, the caffeine/non-polymer catechins ratio: 0.023, and the content of gallic acid: 0.30 wt %. The formula and physical properties of the concentrated beverage composition for reconstitution are shown in Table 3.

Next, using an aliquot (17.0 g) of the thus-obtained concentrated composition and a similar formula as in Example 7, a packaged reconstituted beverage was produced in a similar manner as in Example 1. The formula and taste evaluation results of the packaged reconstituted beverage are shown in Table 4.

Comparative Example 3

A packaged reconstituted beverage of a similar formula as in Example 7 except that the "purified product 2 of green tea extract containing non-polymer catechins" was changed to the "purified product 3 of green tea extract containing non-polymer catechins" was produced in a similar order as in Comparative Example 2. The formula and taste evaluation results of the packaged reconstituted beverage are shown in Table 4.

TABLE 3

| | | Examples | | | | | | Comp. Ex. | |
|---|---|---|---|---|---|---|---|---|---|
| | | 6 | 7 | 8 | 9 | 10 | 11 | 2 | 3 |
| Purified product of green tea extract (Production Example) | | 2 | 2 | 2 | 2 | 3 | 3 | 2 | 3 |
| Formulas of concentrates | (a) Purified product of green tea extract (wt %) | 50.0 | 50.0 | 50.0 | 50.0 | 34.1 | 34.1 | 50.0 | 34.1 |
| | (b) Erythritol (wt %) | 24.5 | 24.5 | 24.5 | 24.5 | 24.5 | 24.5 | 24.5 | 24.5 |
| | (c) Ascorbic acid (wt %) | 0.30 | 0.30 | 0.30 | 0.30 | 0.30 | 0.30 | 0.30 | 0.30 |
| | (d) Sodium bicarbonate (wt %) | 0.15 | 0.15 | 0.15 | 0.15 | — | — | 0.50 | 0.25 |
| | (e) Deionized water (wt %) | Bal. | Bal. | Bal. | Bal. | Bal. | Bal. | Bal. | Bal. |
| | Total amount | 100 | 100 | 100 | 100 | 100 | 100 | 100 | 100 |
| Mixing order | | (e) ↓ (c) ↓ (d) ↓ (a) ↓ (b) | (e) ↓ (c) ↓ (d) ↓ (a) ↓ (b) | (e) ↓ (c) ↓ (d) ↓ (a) ↓ (b) | (e) ↓ (c) ↓ (d) ↓ (a) ↓ (b) | (e) ↓ (c) ↓ (a) ↓ (b) | (e) ↓ (c) ↓ (a) ↓ (b) | (e) ↓ (a) ↓ (c) ↓ (b) ↓ (d) | (e) ↓ (a) ↓ (c) ↓ (b) ↓ (d) |
| | Water temperature (° C.) upon mixing | 40 | 40 | 40 | 40 | 40 | 40 | 40 | 40 |
| | Sterilization temperature (° C.) | 138 | 138 | 138 | 138 | 138 | 138 | 146 | 138 |
| | Storage stability | A | A | A | A | A | A | B | B |
| Physical properties of | (A) Non-polymer catechins (wt %) | 7.50 | 7.50 | 7.50 | 7.50 | 7.50 | 7.50 | 7.50 | 7.50 |
| | (D) Gallic acid (wt %) | 0.30 | 0.30 | 0.30 | 0.30 | 0.053 | 0.053 | 0.030 | 0.053 |

TABLE 3-continued

|  |  | Examples | | | | | | Comp. Ex. | |
|---|---|---|---|---|---|---|---|---|---|
|  |  | 6 | 7 | 8 | 9 | 10 | 11 | 2 | 3 |
| concentrated composition | (E) Percentagee of non-epi-forms (wt %) | 15.0 | 15.0 | 15.0 | 15.0 | 14.0 | 14.0 | 41.1 | 39.8 |
|  | (H) Percentage of gallate body (wt %) | 44.4 | 44.4 | 44.4 | 44.4 | 52.9 | 52.9 | 44.4 | 52.9 |
|  | (G) Caffine/(A) non-polymer catechins (—) | 0.023 | 0.023 | 0.023 | 0.023 | 0.064 | 0.064 | 0.023 | 0.064 |
|  | Brix degree (—) | 39.0 | 39.0 | 39.0 | 39.0 | 45.0 | 45.0 | 39.2 | 45.1 |
|  | Solid content (wt %) | — | — | — | — | — | — | — | — |
|  | Absorbance (—)[2] | 0.141 | 0.141 | 0.141 | 0.141 | 0.368 | 0.368 | 0.281 | 0.516 |
|  | pH (25° C.)[3] | 4.30 | 4.30 | 4.30 | 4.30 | 4.55 | 4.55 | 5.90 | 6.00 |
| After storage | Absorbance (—) (37° C., 4 weeks)[2] | 0.164 | 0.164 | 0.164 | 0.164 | 0.404 | 0.404 | 0.441 | 0.774 |
|  | (A) Non-polymer catechins (wt %) (37° C., 4 weeks) | 7.39 | 7.39 | 7.39 | 7.39 | 7.35 | 7.35 | 3.67 | 3.21 |

[2] Absorbance at 400 nm when diluted with deionized such that the content of non-polymer catechins was controlled to 0.13 wt %.
[3] pH when diluted with deionized such that the content of non-polymer catechins was controlled to 0.13 wt %.

TABLE 4

|  |  | Examples | | | | | | Comp. Ex. | |
|---|---|---|---|---|---|---|---|---|---|
|  |  | 6 | 7 | 8 | 9 | 10 | 11 | 2 | 3 |
| Formulas of reconstituted beverages | Concentrated beverage composition for reconstitution (wt %) | 1.7 | 1.7 | 2.43 | 1.7 | 1.7 | 1.7 | 1.7 | 1.7 |
|  | Concentrate of green tea extract (wt %) | 0.02 | — | 0.02 | — | 0.02 | — | — | — |
|  | Fructose (wt %) | 3.86 | 3.86 | — | — | 3.86 | 3.86 | 3.86 | 3.86 |
|  | Glucose (wt %) | — | — | — | 0.23 | — | — | — | — |
|  | Erythritol (wt %) | 0.29 | 0.29 | — | 0.29 | 0.29 | 0.29 | 0.29 | 0.29 |
|  | Sucralose (wt %) | — | — | — | 0.0114 | — | — | — | — |
|  | Citric acid (wt %) | 0.1 | 0.1 | — | 0.165 | 0.1 | 0.1 | 0.1 | 0.1 |
|  | Sodium citrate (wt %) | — | — | — | 0.085 | — | — | — | — |
|  | Ascorbic acid (wt %) | 0.045 | 0.045 | — | 0.045 | 0.045 | 0.045 | 0.045 | 0.045 |
|  | Sodium ascorbate (Wt %) | — | — | 0.064 | — | — | — | — | — |
|  | Common salt (wt %) | — | — | — | 0.08 | — | — | — | — |
|  | Green tea flavor (wt %) | 0.05 | — | 0.045 | — | 0.05 | — | — | — |
|  | Lemon-lime flavor (wt %) | — | 0.1 | — | — | — | 0.1 | 0.1 | 0.1 |
|  | Grapefruit flavor (wt %) | — | — | — | 0.3 | — | — | — | — |
|  | Grapefruit extract (wt %) | — | — | — | 0.1 | — | — | — | — |
|  | Cyclodextrin (wt %) | — | — | 0.875 | 0.115 | — | — | — | — |
|  | Sodium bicarbonate (wt %) | 0.054 | 0.054 | 0.010 | — | 0.054 | 0.054 | 0.054 | 0.054 |
|  | Deionized water (wt %) | Bal. | Bal. | Bal. | Bal. | Bal. | Bal. | Bal. | Bal. |
|  | Total amount | 100 | 100 | 100 | 100 | 100 | 100 | 100 | 100 |
| After sterilization | Non-polymer catechins (wt %) | 0.135 | 0.128 | 0.180 | 0.127 | 0.135 | 0.128 | 0.134 | 0.134 |
|  | pH (25° C.) | 4.05 | 4.01 | 5.98 | 3.43 | 4.01 | 4.05 | 5.45 | 5.45 |
|  | Bitterness[4] | 2 | 2 | 2 | 2 | 3 | 3 | 4 | 4 |
|  | Astringency[5] | 1 | 1 | 2 | 1 | 2 | 2 | 3 | 3 |
|  | Sourness[6] | 1 | 1 | 1 | 1 | 1 | 1 | 2 | 2 |
|  | Sweetness[7] | 2 | 2 | 2 | 2 | 2 | 2 | 2 | 2 |

[4] 6-stage evaluation of bitterness, 1: no bitterness, 2: substantially-reduced bitterness, 3: reduced bitterness, 4: slightly-reduced bitterness, 5: bitter, 6: significant bitterness.
[5] 6-stage evaluation of astringency, 1: no astringency, 2: substantially-reduced astringency, 3: reduced astringency, 4: slightly-reduced astringency, 5: astringent, 6: significant astringency.
[6] 3-stage evaluation of sourness, 1: extremely good sourness, 2: good sourness, 3: usual sourness.
[7] 4-stage evaluation of sweetness, 1: extremely good sweetness, 2: good sweetness, 3: usual sweetness, 4: insufficient sweetness.

It is evident from Tables 2 and 4 that the packaged beverages of Examples 1 to 11 were improved in bitterness, astringency and sourness-sweetness balance over the packaged beverages of Comparative Examples 1 to 3.

The invention claimed is:

1. A concentrated beverage composition for reconstitution, comprising ingredients (A), (B) and (C):

(A) from 0.5 to 25.0 wt % of non-polymer catechins,
(B) a carbohydrate, and
(C) a hydroxycarboxylic acid,
wherein the composition meets conditions (D) and (E) as well as at least one of conditions (F1), (F2) and (F3):
(D) a content of gallic acid is lower than 0.6 wt %,
(E) a percentage of non-epi-forms in the non-polymer catechins is from 5 to 25 wt %,
(F1) a Brix degree is from 20 to 70, and when diluted with deionized water to give a non-polymer catechin concentration of 0.13 wt %, a pH is from 2.5 to 6.0,
(F2) a solid content is not lower than 70.0 wt %, and when diluted with deionized water to give a non-polymer catechin concentration of 0.13 wt %, a pH is from 2.5 to 6.0, and
(F3) an absorbance at 400 nm is smaller than 0.5 and a pH is from 2.5 to 6.0, when diluted with deionized water to give a non-polymer catechin concentration of 0.13 wt %.

2. The concentrated composition according to claim 1, comprising a concentrated product of a tea extract, a purified product of a tea extract, or a combination thereof.

3. The concentrated composition according to claim 2, wherein the purified product of the tea extract is one obtained by purifying the green tea extract in a mixed solution of an organic solvent and water at a weight ratio of from 75/25 to 10/90.

4. The concentrated composition according to claim 2, wherein the purified product of the tea extract is one obtained by purifying the green tea extract in a mixed solution of an organic solvent and water at a weight ratio of from 99/1 to 75/25.

5. The concentrated composition according to claim 1, wherein a content weight ratio of caffeine (G) to the non-polymer catechins (A), (G)/(A), is from 0.0001 to 0.16.

6. The concentrated composition according to claim 1, wherein (H) a percentage of gallate body in the non-polymer catechins is from 5 to 55 wt %.

7. The concentrated composition according to claim 1, which has been subjected to sterilization treatment at from 60 to 145° C.

8. The composition according to claim 1, which has been subjected to spray drying or freeze drying.

9. A reconstituted beverage prepared by reconstituting the concentrated composition according to claim 1.

10. A packaged reconstituted beverage obtained by packaging the reconstituted beverage according to claim 9 in a container.

11. A process for producing the composition for reconstitution according to claim 1, comprising (1) and (2) performed in this order:
 (1) mixing the hydroxycarboxylic acid in water,
 (2) mixing a concentrate product of tea extract, a purified product of tea extract, or a combination thereof, which comprises non-polymer catechins, in the water, and
 (3) mixing the carbohydrate in the water.

12. The process according to claim 11, which further comprises adjusting a pH to be performed between (1) and (2), wherein said adjusting comprises adjusting an aqueous solution obtained in (1) such a way that a pH of the aqueous solution falls within a range of from 2.5 to 6.0 when diluted with deionized water to give a non-polymer catechin concentration of 0.13 wt %.

13. The process according to claim 12, wherein the pH is adjusted by mixing an aqueous solution which comprises at least one salt selected from sodium hydrogencarbonate, sodium carbonate, potassium hydrogencarbonate and potassium carbonate.

14. The process according to claim 13, wherein, after the aqueous solution comprising at least one salt selected from sodium hydrogencarbonate, sodium carbonate, potassium hydrogencarbonate and potassium carbonate is charged, stirring is conducted until bubbling subsides.

15. The process according to claim 12, wherein (1) to (3) and said adjusting are all conducted at a temperature not higher than 45° C.

16. The process according to claim 13, wherein (1) to (3) and said adjusting are all conducted at a temperature not higher than 45° C.

17. The process according to claim 14, wherein (1) to (3) and said adjusting are all conducted at a temperature not higher than 45° C.

* * * * *